April 21, 1925.
J. C. SCHELLENG
1,534,287
METHOD OF AND MEANS FOR ELECTRIC ENERGY TRANSLATION
Filed Dec. 21, 1923
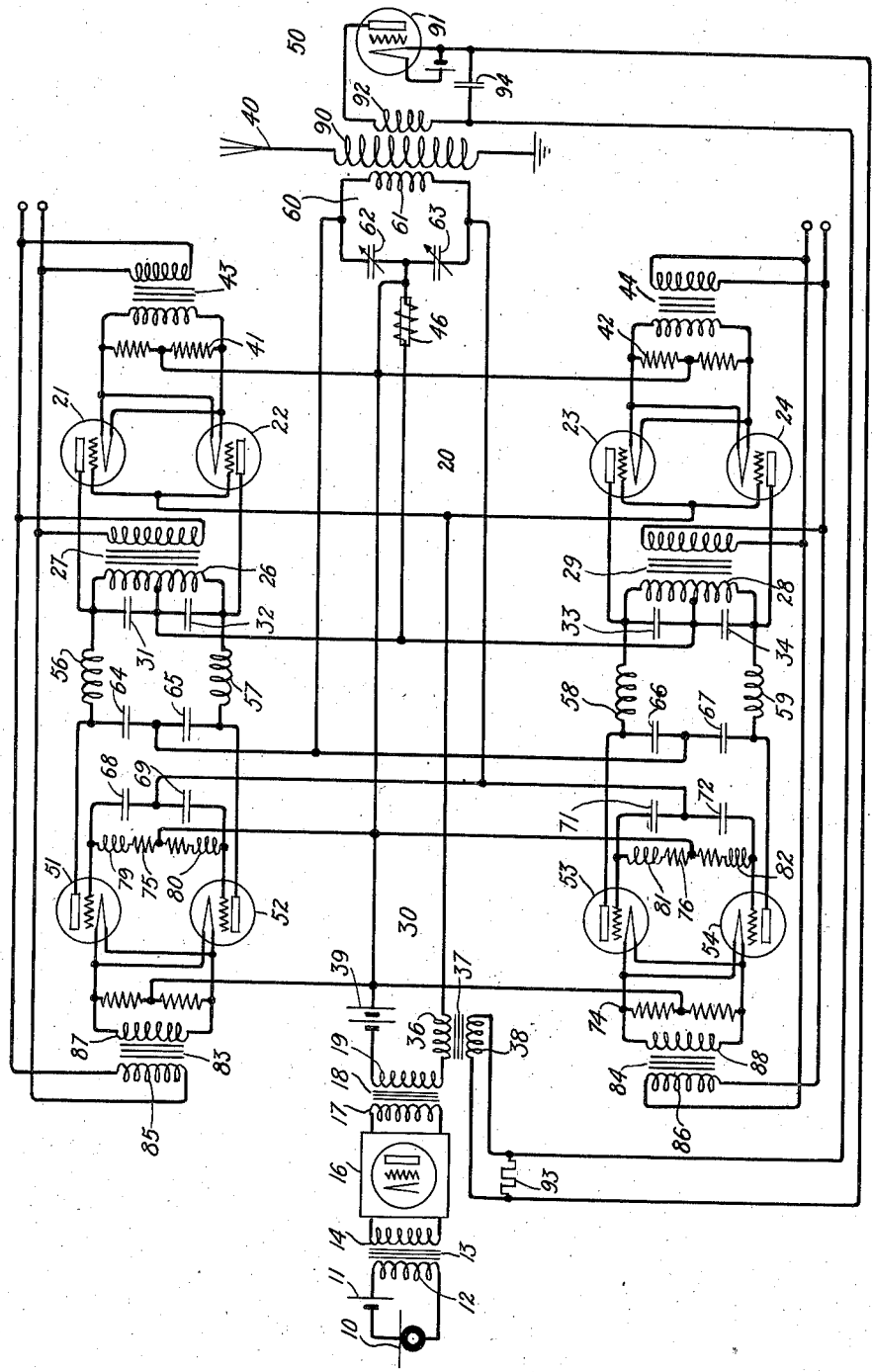
Inventor:
John C. Schelleng
by ⎯⎯⎯⎯ Att'y.

Patented Apr. 21, 1925.

1,534,287

UNITED STATES PATENT OFFICE.

JOHN C. SCHELLENG, OF EAST ORANGE, NEW JERSEY, ASSIGNOR TO WESTERN ELECTRIC COMPANY, INCORPORATED, OF NEW YORK, N. Y., A CORPORATION OF NEW YORK.

METHOD OF AND MEANS FOR ELECTRIC ENERGY TRANSLATION.

Application filed December 21, 1923. Serial No. 681,920.

*To all whom it may concern:*

Be it known that I, JOHN C. SCHELLENG, a citizen of the United States of America, residing at East Orange, in the county of Essex, State of New Jersey, have invented certain new and useful Improvements in Methods of and Means for Electric Energy Translation, of which the following is a full, clear, concise, and exact description.

This invention relates to methods of and means for electrical energy translation.

An object of this invention is to provide improved methods of transmitting electrical energy modulated in accordance with signals.

Another object of the invention is to provide improved methods of rectifying polyphase alternating current and of suppressing variations in the rectified current.

A further object of the invention is to utilize two phase electric currents as the sources of power in electrical energy transmission systems.

Another object of the invention is to heat the filaments of space discharge devices and to supply current to a modulator and an oscillator from a common source of polyphase electric current and to suppress ripples in the current supplied.

The system which has been chosen to illustrate the organization and operation of this invention is a radio transmitting system, comprising a source of signals, a rectifier-amplifier, an oscillator coupled to an antenna, and a device for suppressing ripples from the current from the rectifier.

The source of signals may be an ordinary microphone transmitter designed to be actuated by speech sounds. The current from the transmitter may be amplified by a vacuum tube amplifier of any well known type. The rectifier comprises pairs of vacuum tubes connected symmetrically to opposite phases of a source of two phase alternating current. The oscillator also comprises pairs of vacuum tubes symmetrically arranged with respect to the output circuit of the rectifier modulator. Modulation is accomplished in accordance with the principles employed in so-called constant current modulation systems. See Patent No. 1,442,146, granted January 16, 1923 to R. A. Heising. By means of a symmetrical connection of the rectifier tubes both halves of the alternating current supplied thereto are utilized. The pairs of tubes of the oscillator have a common circuit including a resonant circuit connected between their filament and plate electrodes. The resonant circuit supplies energy to an antenna.

For suppressing ripples in the rectified current a high frequency rectifier is coupled also to the resonant circuit and to a control circuit of the rectifier-modulator. By this means ripples in the rectified current impress potentials upon the grids of the rectifier tubes such that the ripples are substantially eliminated.

The figure of the drawing illustrates a radio transmitting system utilizing rectified two phase current and having means to suppress ripples therein.

Referring to the drawing, the system therein shown comprises a source of signals 10, an oscillator 30, a rectifier-modulator 20, an antenna 40 and a ripple suppressing device 50. The source of signals 10, here shown as an ordinary microphone transmitter, is connected in series with a battery 11 and a primary winding 12 of a transformer 13. A secondary winding 14 of this transformer is connected to an amplifier 16 which may be a vacuum tube amplifier of any well known type designed to amplify currents having frequencies within the range of audibility. The output circuit of amplifier 16 is connected to the primary winding 17 of transformer 18 having its secondary winding 19 connected in series to an input circuit common to the tubes of the rectifier-modulator 20.

Rectifier-modulator 20 comprises three electrode vacuum tubes 21, 22, 23 and 24. Tubes 21 and 22 have their plate circuits connected symmetrically to one phase of a source of two-phase alternating current and tubes 23 and 24 have their plate circuits similarly connected to the other phase of the same source of current. The anodes of tubes 21 and 22 connect to terminals of secondary winding 26 of transformer 27, the primary winding of which connects to one phase of the source of two-phase alternating current. The anodes of tubes 23 and 24 are connected to the terminals of secondary winding 28 of transformer 29. The primary of this transformer is connected to the other phase of the source of current. The secondary winding 26 is shunted by condensers 31 and 32 designed to pass signal frequency currents. Secondary 28 is shunted by condensers 33 and 34 designed also to pass signal frequency currents.

The grids of tubes 21, 22, 23 and 24 are connected to a common input circuit which may be traced from the grids through secondary winding 36 of transformer 37, secondary winding 19 of transformer 18, grid polarizing battery 39, divided resistances 41 and 42 in parallel, filaments of tubes 21 and 22 in parallel across resistance 41 and filaments of tubes 23 and 24 in parallel across resistance 42. Resistances 41 and 42 are shunted by the secondary windings of transformers 43 and 44 respectively and the primaries of these transformers are connected to opposite phases of the two phase source in order to supply heating current to the respective filaments.

The anodes of tube 21 and 22, 23 and 24 are connected to a common circuit. This connection is made by taps to the midpoint of the secondary windings 26 and 28 respectively, which taps are also intermediate to the condensers 31 and 32, 33 and 34, respectively. The common output circuit includes choke coil 46 which connects at its one terminal to the mid-points of secondaries 26 and 28 and at its opposite terminal to the mid-points of resistances 41 and 42. Through the resistances connection is made to the filaments of the rectifier-modulator tubes.

Oscillator 30 comprises the three electrode vacuum tubes 51, 52, 53 and 54. The anodes of tubes 51 and 52 are connected symmetrically to the terminals of secondary winding 26 of transformer 27 in series with high frequency choke coils 56 and 57 which are on opposite side of the winding 46. Tubes 53 and 54 are connected in a similar manner to the secondary winding 28 of transformer 29 in series with high frequency choke coils 58 and 59.

The plate circuits of tubes 51 and 52, 53 and 54 all include common choke coil 46 and are connected across individual portions of the secondary windings 26 and 28. For example, the plate circuit of tube 51 may be traced as follows: plate of the tube, filament of the tube, upper half of divided resistance 73, choke coil 46, upper half of secondary winding 26, high frequency choke coil 56 to the plate of the tube. The choke coils 56, 57, 58 and 59 are designed to offer high impedance to the oscillatory currents but low impedance to direct currents.

The filaments and plates of the oscillator tubes are connected to a common circuit which includes a resonant circuit 60 and variable condensers 62 and 63. One terminal of resonant circuit 60 connects to points intermediate to the pairs of condensers 64 and 65, 66 and 67. The opposite terminal of resonant circuit 60 connects to points intermediate to the pairs of condensers 68 and 69, 71 and 72. Condensers 64 and 65 are connected between the plates of tubes 51 and 52 and condensers 66 and 67 are connected between the plates of tubes 53 and 54. Condensers 68 and 69 are connected across the grids of tubes 51 and 52. Condensers 71 and 72 are connected across the grids of tubes 53 and 54. There are thus provided a plurality of oscillatory paths having a resonant circuit 60 in common thereto. One of these circuits may be traced as follows: plate of tube 51, condenser 64, resonant circuit 60, upper half of resistance 73 to the filament of tube 51. Choke coils 56 and 57, 58 and 59 thus serve to prevent the flow of oscillatory current through the plate circuits of the oscillator. Divided resistances 75 and 76 are connected to the grids of tubes 51 and 52, 53 and 54, respectively, in series with and between high frequency choke coils 79 and 80, 81 and 82, respectively. Resistances 75 and 76 have mid-taps connected to a common lead to the mid-point of resistances 73 and 74. Resistance 73 is connected in shunt to the filaments of tubes 51 and 52 in parallel. Resistance 74 is connected in a similar manner to filaments of tubes 53 and 54.

Transformers 83 and 84 are provided for supplying heating current to the filaments of the oscillator tubes. The primary winding 85 of transformer 87 connects to one phase of the two-phase source of alternating current whereas winding 86 of transformer 84 connects to the other phase. The secondary 87 of transformer 83 is connected in shunt to filament of tubes 51 and 52 and also to resistance 73. The secondary 88 of transformer 84 connects in a like manner to the filament of tubes 53 and 54 and resistance 74.

The inductance coil 61 in the resonant circuit 60 is coupled to the coil 90 connected between the antenna 40 and ground. A high frequency rectifier 50 comprises a vacuum tube 91 having two electrodes connected to a circuit including in series, coil 92, coupled to coils 61 and 90 and winding 38 of transformer 37 shunted by resistance 93. The condenser 94 is connected in shunt to the coil 92 and tube 91.

In the operation of this system, signal variations are produced in the current flowing through primary 12 of transformer 13 by means of the transmitter 10. These variations correspond to the speech sound waves impinging upon the diaphragm of the transmitter. Corresponding current variations are set up in the secondary 14; amplified by amplifier 16 and transmitted through transformer 18 to the grid circuits of the rectifier amplifier 20 and there serve to vary the impedance of the space paths of the tubes 21, 22, 23 and 24. Thus are produced variations in the flow of current in the plate circuit of these tubes, which circuits are connected across the corresponding plate circuits of tubes 51, 52, 53 and 54 of oscillator 30. The plate circuits of rectifier-amplifier 20 are likewise in shunt to individual portions of secondary windings 26 and 28 which are connected in parallel to the common choke coil 46.

It will be observed that the rectifier 20 and the oscillator 30 constitute a modulator arranged in accordance with the constant current system. Choke coil 46 substantially prevents variations in the current flowing in the respective portions of secondary windings 26 and 28. Thus the variations of impedance of tubes 21 and 22, 23 and 24 cause similar variations in the amplitude of space currents flowing in oscillator 30.

It is found that, when two phase alternating currents are applied to a rectifier modulator such as has been described, variations which may be termed ripples occur in the rectified current. This invention provides means for substantially eliminating these ripples. Oscillations produced in resonant circuit 60 of oscillator 30 contain ripple variations impressed thereon from the rectifier modulator 20. High frequency rectifier 50 which is coupled to the resonant circuit 60 is arranged to transmit current containing variations of the ripple frequency to the input circuit of rectifier modulator 20 by means of transformer 35 which has its secondary 37 connected in series in this input circuit. Thus potentials varying in accordance with the frequency of ripples are impressed upon the grids of tubes 21, 22, 23 and 24. The windings of transformer 35 are so connected that the potentials impressed upon these grids vary the impedance of the tubes in such manner that the ripples are substantially eliminated.

Resistances 75 and 76 provide leak paths for the grids of tubes 51, 52, 53 and 54 respectively. High frequency choke coils 79, 80, 81 and 82 prevent the flow of high frequency oscillatory current in these paths. Condensers 64, 65, 66, 67, 68, 69, 71 and 72 are arranged to prevent the flow of rectified current in the oscillatory circuit of oscillator 30. Condenser 94 connected in shunt to high frequency rectifier tube 91 offers a path of low impedance to high frequency current but relatively high impedance to ripple current. Resistance 93 is provided to stabilize the impedance of the circuit to which it is connected.

Although a specific embodiment of this invention has been utilized in order to illustrate the organization and operation thereof, it will be apparent that numerous other embodiments will readily occur to persons skilled in the art and that, consequently, the scope of this invention is not to be determined by this embodiment but by the scope of the appended claims.

The invention claimed is:

1. In an electric wave transmission system, a source of signals, a rectifier for polyphase currents, an oscillator supplied with current from said rectifier, said oscillator comprising a plurality of three-electrode vacuum tubes symmetrically arranged and a resonant circuit in common to the plates and filaments thereof, and means coupled to said resonant circuit and to said rectifier for eliminating ripples in the rectified current.

2. In a modulator, a source of signals, means for generating oscillations, said means being supplied with rectified polyphase current, means for modulating said oscillations in accordance with said signals, and a high frequency rectifier supplied with modulated currents for suppressing ripples in said rectified current.

3. A modulating system comprising a source of signals, a rectifier for alternating current comprising a plurality of vacuum tubes in parallel controlled by said source, a vacuum tube oscillator supplied with current from said rectifier, a resonant circuit for said oscillator, an antenna coupled to said resonant circuit, and means coupled to said antenna and to said resonant circuit for suppressing ripples in the rectified current.

4. In an electric energy translation system, a polyphase rectifier controlled by a source of signals, an oscillator coupled to said rectifier, said oscillator comprising a resonant circuit common to a plurality of vacuum tubes, and a rectifier coupled to said resonant circuit, said rectifier comprising a single two-electrode vacuum tube for eliminating ripples in the current from said polyphase rectifier.

5. In an electric energy translation system, an oscillator, a polyphase rectifier having input and output circuits and a single phase rectifier, said single phase rectifier being impressed with ripple currents from said polyphase rectifier and being coupled to the input circuit of said polyphase rectifier for suppressing said ripple currents.

6. In a modulating system, a two-phase rectifier controlled by a source of signals, an oscillator comprising pairs of three electrode vacuum tubes connected to respective phases of said rectifier, means for heating the filaments of said vacuum tubes by alternating current, and means comprising a high frequency rectifier coupled to the output circuit of said oscillator to substantially eliminate harmonics in the current from said two-phase rectifier.

7. The method of modulation which comprises producing rectified polyphase currents, controlling said currents in accordance with signals, modifying the amplitude of oscillating current by means of said rectified currents, rectifying said modified currents, and utilizing the energy thereof to suppress ripples in said rectified polyphase currents.

8. The method of electric energy translation which comprises producing electric currents and maintaining said currents in oscillation at variable amplitude by means of rectified and signal-controlled energy, and producing rectification of said currents as a means of eliminating ripple frequency fluctuations therein.

9. In a radiant energy transmission system, a source of signals, an amplifier therefor, a polyphase rectifier and an oscillator having respective input and output circuits, a choke coil common to the output circuits of said oscillator and rectifier, a resonant circuit connected between the input and output circuits of said oscillator, and means traversed by currents from said oscillator for substantially eliminating ripples from the current produced by said rectifier.

10. In a modulator, a plurality of pairs of vacuum tubes, said pairs of tubes being symmetrically connected to individual phases of a source of polyphase current, common input and output circuits for said tubes, a vacuum tube oscillator, and means traversed by currents from said oscillator, said means being coupled to said common input circuit to suppress ripples in the current flowing in said output circuit.

11. In a high frequency signaling system, a source of signals, a source of electric power, an amplifier for said source of signals, said amplifier being supplied from said source of power, the output of said amplifier being so connected as to modulate a source of high frequency power, and means common to the output circuit of said source of high frequency power and to the input circuit of said amplifier, said means being so connected as to substantially eliminate the ripple in the output of said source of high frequency power.

12. The method of preventing undesired modulation in waves produced by a modulated wave producing device which comprises utilizing a portion of the output of modulated wave energy to effect a correcting action by operating upon the power supply source of said device.

13. A wave modulator, a unidirectional current supply source supplying current thereto, a rectifier controlled by modulated waves produced by said source, and electrical elements whereby said rectifier varies the current supplied by said source in accordance with variations in the modulated waves.

14. A high frequency wave modulator in combination with a current supply source therefor and means whereby the modulated wave output controls the supply of current from said source.

In witness whereof I hereunto subscribe my name this 17th day of December, A. D. 1923.

JOHN C. SCHELLENG.